United States Patent
Menarly et al.

(10) Patent No.: US 12,512,567 B2
(45) Date of Patent: Dec. 30, 2025

(54) BATTERY CONNECTION MODULE

(71) Applicant: Molex, LLC, Lisle, IL (US)

(72) Inventors: Goenawan Menarly, Jurong Town (SG); Sheau Noan Cheong, Jurong Town (SG); Kian Heng Lim, Jurong Town (SG)

(73) Assignee: Molex, LLC, Lisle, IL (US)

( * ) Notice: Subject to any disclaimer, the term of this patent is extended or adjusted under 35 U.S.C. 154(b) by 732 days.

(21) Appl. No.: 17/887,023

(22) Filed: Aug. 12, 2022

(65) Prior Publication Data
US 2023/0055887 A1 Feb. 23, 2023

(51) Int. Cl.
*H01M 50/569* (2021.01)
*G01K 1/14* (2021.01)
(Continued)

(52) U.S. Cl.
CPC ............ *H01M 50/569* (2021.01); *G01K 1/14* (2013.01); *H01M 10/482* (2013.01);
(Continued)

(58) Field of Classification Search
CPC ............ H01M 50/569; H01M 50/519; H01M 50/284; H01M 50/507; H01M 50/503;
(Continued)

(56) References Cited

U.S. PATENT DOCUMENTS 9,780,351 B2  10/2017  Shimoda et al.
2020/0014083 A1  1/2020  Matsushima et al.

FOREIGN PATENT DOCUMENTS

CN  107871839 A  4/2018
CN  111384347 A  7/2020
(Continued)

OTHER PUBLICATIONS

CN111384347 English translation. Lin et al. China. Jul. 7, 2020. (Year: 2020).*

*Primary Examiner* — Christopher P Domone

(57) ABSTRACT

A battery connection module includes a carrying tray, a plurality of busbars, a flexible circuit board and at least one temperature sensing construction, the plurality of busbars are assembled on the carrying tray and are used to connect the plurality of batteries in series; the flexible circuit board is assembled on the carrying tray and includes a plurality of flexible supporting arms which extend from the flexible circuit board to connect the plurality of busbars, the temperature sensing construction includes a first flexible supporting arm, a first busbar, a temperature sensor and a first metal bridging piece, the first flexible supporting arm is one of the plurality of flexible supporting arms and the first busbar is one of the plurality of busbars, the first busbar has a depressed portion close to the flexible circuit board, a tip of the flexible supporting arm has a setting surface which is used to provide the temperature sensor thereon, the temperature sensor is directly positioned above the depressed portion, the first metal bridging piece includes a first end and a second end, the first end is connected to the setting surface of the tip of the flexible supporting arm, the second end is connected to the first busbar.

20 Claims, 13 Drawing Sheets

(51) Int. Cl.
    *H01M 10/48*       (2006.01)
    *H01M 50/204*     (2021.01)
    *H01M 50/503*     (2021.01)
    *H01M 50/507*     (2021.01)
    *H01M 50/51*      (2021.01)
    *H01M 50/519*     (2021.01)

(52) U.S. Cl.
    CPC ....... *H01M 10/486* (2013.01); *H01M 50/204* (2021.01); *H01M 50/503* (2021.01); *H01M 50/507* (2021.01); *H01M 50/51* (2021.01); *H01M 50/519* (2021.01)

(58) Field of Classification Search
    CPC ... H01M 10/48; H01M 10/482; H01M 10/486
    See application file for complete search history.

(56) References Cited

FOREIGN PATENT DOCUMENTS

| | | |
|---|---|---|
| CN | 111435723 A | 7/2020 |
| CN | 112997354 A | 6/2021 |
| WO | 2013080669 A1 | 6/2013 |

\* cited by examiner

BATTERY CONNECTION MODULE

RELATED APPLICATIONS

This application claims priority to Chinese Patent Application Serial No. 202110947936.5, filed Aug. 18, 2021, which is incorporated herein by reference in its entirety.

TECHNICAL FIELD

The present disclosure relates to the field of battery technology, and specifically relates to a battery connection module.

BACKGROUND ART

Chinese invention patent application publication No. CN111435723A discloses a battery connection module, and specifically discloses that, temperature sensing members are provided to a flexible circuit board and each temperature sensing member is adjacent to a first end portion of a temperature collecting piece, the first end portion of the temperature collecting piece is formed with an opening, the temperature sensing member is positioned in the opening. The flexible circuit board is further provided with a plurality of packaging blocks which packages the temperature sensing members therein respectively, for example by means of adhesive-filling packaging and a plurality of supporting pieces which correspond to the temperature sensing members respectively and are provided on a side of the flexible circuit board opposite to a surface where the temperature sensing members are provided. The temperature sensing members are protected by the packaging blocks respectively. The temperature sensing members in this prior art are provided on the flexible circuit board, are still distanced from batteries and busbars as a heat generation source by a certain distance, thereby affecting accuracy of temperature collection.

Chinese invention patent application issuance publication CN105684186B (corresponding to United States patent application issuance No. U.S. Pat. No. 9,780,351B2) discloses that a case has an upper case and a lower case which are latched with each other, latching pieces provided to the upper case latch with latching protrusions provided to the lower case respectively, so that the upper case and the lower case become an assembled state. In this prior art, the latching piece of the upper case is constructed with an aperture, and the upper case is provided with slits respectively positioned at two sides of the latching piece so that the latching piece has elasticity, because the slits respectively at the two sides of the latching piece destroy constructional strength of the upper case around the latching piece, a problem, such as damaging or wrapping of the upper case, which affects quality of the upper case, is prone to occur.

SUMMARY

Therefore, an object of the present disclosure is to provide a battery connection module which can improve at least one deficiency in the prior art.

In an embodiment, a battery connection module of the present disclosure is used to connect a plurality of batteries, the battery connection module comprises a carrying tray, a plurality of busbars, a flexible circuit board and at least one temperature sensing construction, the plurality of busbars are assembled on the carrying tray and are used to connect the plurality of batteries in series; the flexible circuit board is assembled on the carrying tray, the flexible circuit board comprises a plurality of flexible supporting arms which extend from the flexible circuit board to connect the plurality of busbars, the temperature sensing construction comprises a first flexible supporting arm, a first busbar, a temperature sensor and a first metal bridging piece, the first flexible supporting arm is one of the plurality of flexible supporting arms and the first busbar is one of the plurality of busbars, the first busbar has a depressed portion close to the flexible circuit board, a tip of the flexible supporting arm has a setting surface which is used to provide the temperature sensor thereon, the temperature sensor is directly positioned above the depressed portion, the first metal bridging piece comprises a first end and a second end, the first end is connected to the setting surface of the tip of the flexible supporting arm, the second end is connected to the first busbar.

In some embodiments, the first end of the first metal bridging piece has an opening, the temperature sensor is positioned in the opening.

In some embodiments, the temperature sensing construction further comprises a packaging block which is provided on the setting surface, the packaging block fully covers the temperature sensor and the first end of the first metal bridging piece.

In some embodiments, the temperature sensing construction further comprises a back plate, the back plate is provided on a back surface of the first flexible supporting arm opposite to the setting surface of the first flexible supporting arm.

In some embodiments, the setting surface and the packaging block back the depressed portion.

In some embodiments, the temperature sensing construction further comprises a thermal conductive pad, the thermal conductive pad is provided between the back plate and a bottom surface of the depressed portion.

In some embodiments, the setting surface and the packaging block face the depressed portion.

In some embodiments, the first busbar has a cutout formed at a side of the first busbar which faces the flexible circuit board and a protruding plate portion positioned alongside the cutout, a side of the protruding plate portion facing the cutout has the depressed portion, the first flexible supporting arm extends into the cutout, the second end of the first metal bridging piece is connected to the protruding plate portion.

In some embodiments, the flexible circuit board extends along a length direction, the cutout and the protruding plate portion face the flexible circuit board along a width direction, the tip of the first flexible supporting arm extends into the cutout and extends in the length direction, the first metal bridging piece extends in the length direction.

In some embodiments, the first busbar has two or more battery connection portions and a buffering portion positioned between the two adjacent battery connection portions, the cutout spans the buffering portion.

In some embodiments, the first metal bridging piece is electrically connected to a voltage collection circuit trace of the flexible circuit board so as to collect voltage.

In another embodiment, a the battery connection module of the present disclosure is used to connect a plurality of batteries, the battery connection module comprises a carrying tray, a plurality of busbars and an upper cover, the plurality of busbars are assembled on the carrying tray and are used to connect the plurality of batteries in series, the upper cover latches with the carrying tray and has a top plate and a skirt edge positioned around the top plate and vertically provided, the skirt edge has no broken holes, an inner wall surface of the skirt edge is provided with a first latching portion which extends inwardly, and a periphery of the carrying tray is provided with a second latching portion which extends outwardly and latches with the first latching portion.

In some embodiments, the first latching portion is constructed as a protruding block which extends inwardly, the second latching portion has an upward extending arm which is deflectable and a latching block which extends outwardly, the latching block latches with an upper end of the protruding block.

In some embodiments, the protruding block has a first latching surface and a first guiding surface, the latching block has a second guiding surface and a second latching surface; both the first latching surface and the second latching surface are flat surfaces, the first latching surface extends horizontally and inwardly from the inner wall surface of the skirt edge, the second latching surface extends horizontally and outwardly from an outer wall surface of the upward extending arm; when the protruding block and the latching block latch with each other, the first guiding surface and the second guiding surface are capable of abutting against each other and sliding relative to each other, and the first latching surface and the second latching surface are capable of latching with each other.

In some embodiments, an aperture is provided close to an edge of the top plate of the upper cover and corresponds to the first latching portion.

In some embodiments, a bending edge which warps upwardly is provided close to the edge of the top plate of the upper cover.

One embodiment of the above disclosure has the following advantages or beneficial effects.

In the battery connection module of the embodiment of the present disclosure, the temperature sensor is directly close to the depressed portion of the first busbar which generates heat and due to the thermal conductivity of the first metal bridging piece immediately adjacent to the temperature sensor, it is able to increase the accuracy of the temperature collection of the temperature sensor and shorten the temperature response time.

In addition, because the skirt edge has no broken holes and the inner wall surface of the skirt edge is provided with the first latching portion which extends inwardly, the structural strength of the skirt edge of the upper cover is ensured, a problem, such as damaging and warping of the upper cover, which affects quality of the upper cover, is not prone to occur.

DETAILED DESCRIPTION OF THE PREFERRED EMBODIMENTS

Figure 1:
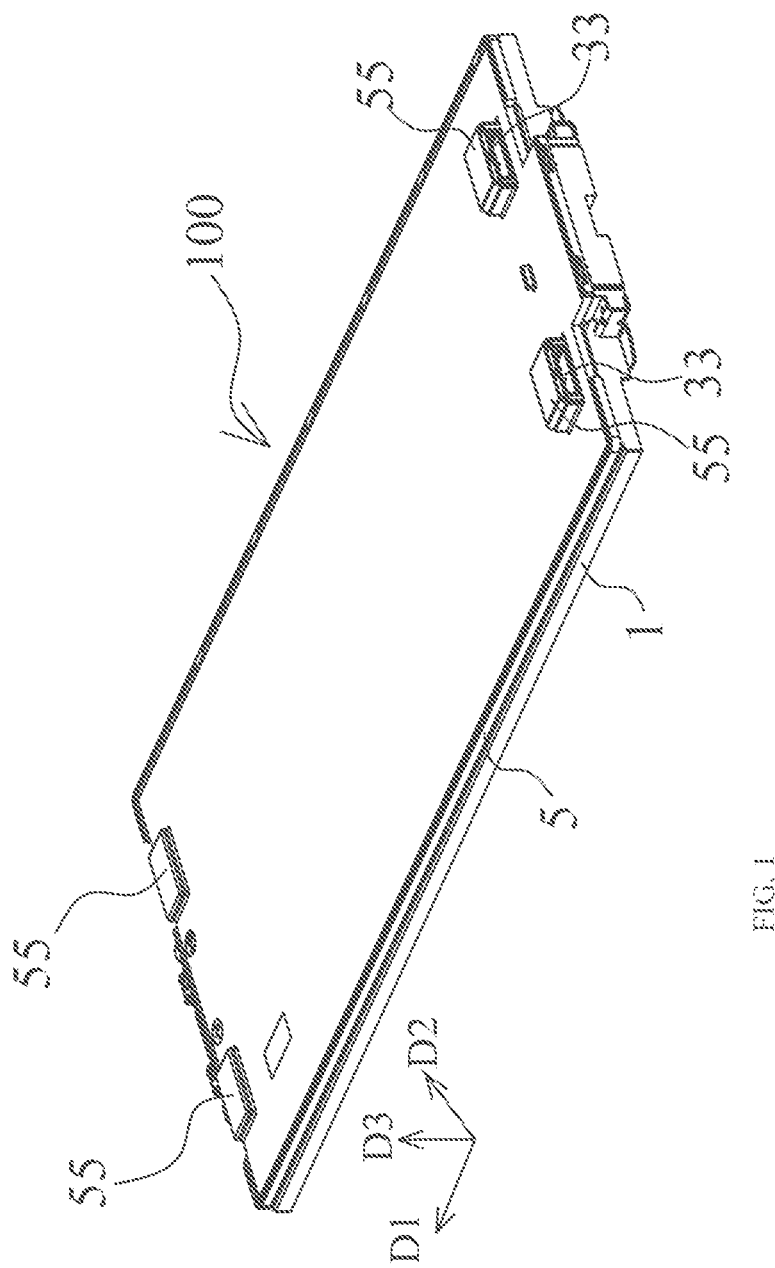
FIG. 1 illustrates a structural schematic view of a battery connection module of a first embodiment of the present disclosure.

Exemplary embodiments will now be described more fully with reference to the accompanying drawings. However, the exemplary embodiments may be implemented in many forms and the present disclosure should not be construed to be limited to the embodiments set forth herein; instead, these embodiments are provided so that the present disclosure will be full and complete, and the concepts of the exemplary embodiments will be fully conveyed to the person skilled in the art. The same reference numerals indicate the same or similar structure in the drawings, and the repeated description thereof will be omitted.

Figure 2:
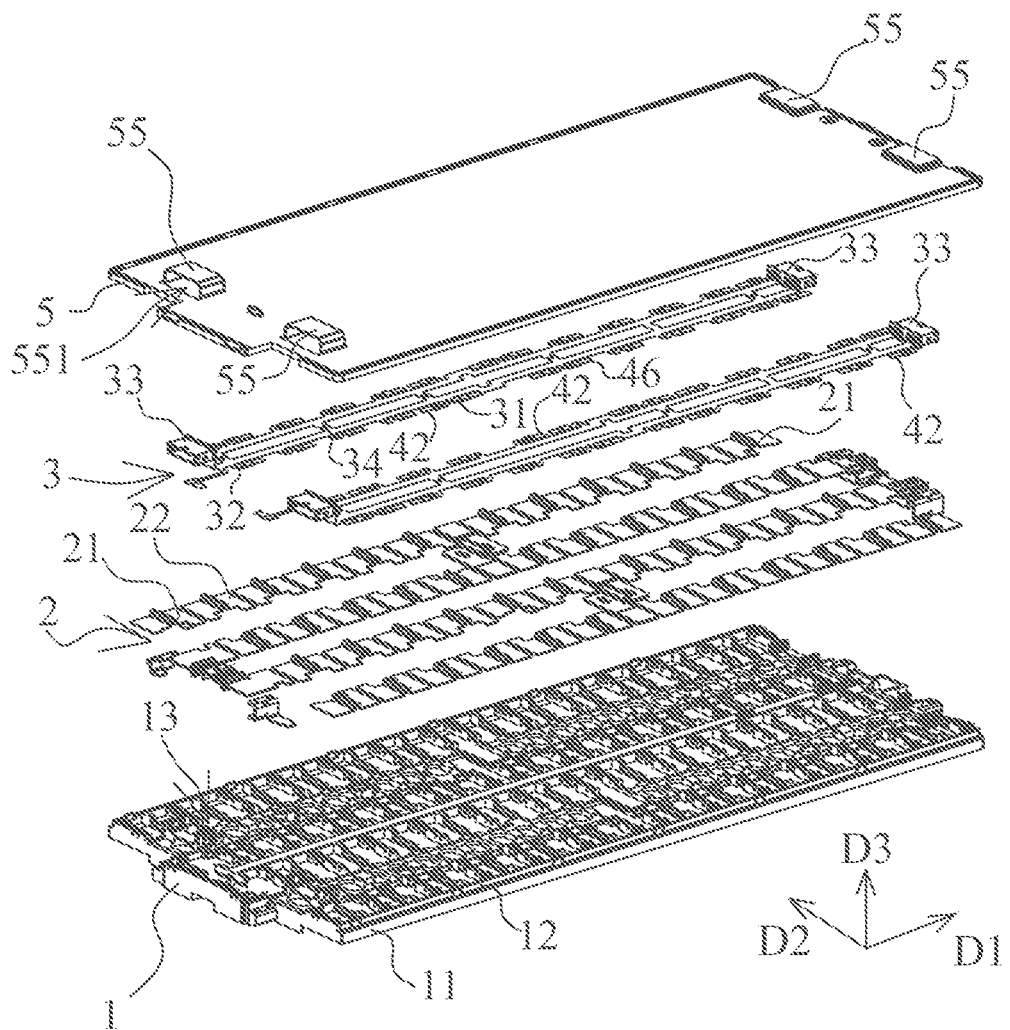
FIG. 2 illustrates an exploded schematic view of the battery connection module of the first embodiment of the present disclosure.

As shown in FIG. 1 and FIG. 2, FIG. 1 illustrates a structural schematic view of a battery connection module 100 of first embodiment of the present disclosure, FIG. 2 illustrates an exploded schematic view of the battery connection module 100 of the first embodiment of the present disclosure. The battery connection module 100 of the first embodiment of the present disclosure is used to connect a plurality of batteries and is used to collect voltages, temperatures or other parameters of the plurality of batteries.

The battery connection module 100 of the embodiments of the present disclosure includes a carrying tray 1, a plurality of busbars 2, a flexible circuit board 3 and at least one temperature sensing construction 4.

For example, the carrying tray 1 may be integrally formed by an insulating material, and may be a rectangular structure which extends along a length direction D1 and a width direction D2, here the length direction D1 and the width direction D2 are perpendicular to each other.

The carrying tray 1 includes a tray body 11 and a side wall 12 integrally constructed to the tray body 11, the side wall 12 is provided at an edge of the tray body 11.

Figure 3:
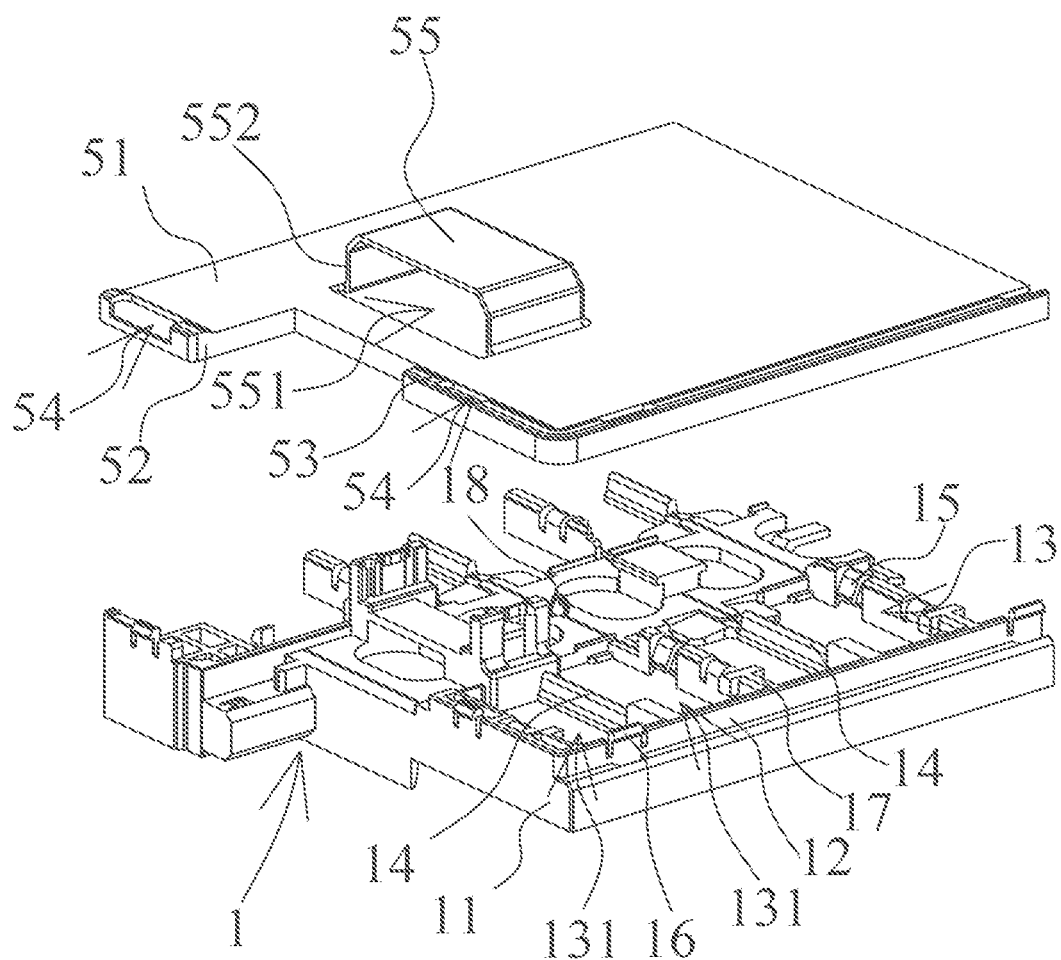
FIG. 3 illustrates an exploded schematic view of a carrying tray and an upper cover of the first embodiment of the present disclosure.

As shown in FIG. 2 and FIG. 3, FIG. 3 illustrates an exploded schematic view of the carrying tray 1 and an upper cover 5 of the first embodiment of the present disclosure. The carrying tray 1 includes a plurality of receiving grooves 13, the plurality of receiving grooves 13 are used to receive the plurality of busbars 2 respectively.

The carrying tray 1 further includes a plurality of partitioning walls 17. One end of each of the plurality of partitioning walls 17 is connected to the side wall 12 and the other end of each of the plurality of partitioning walls 17 extends toward the interior of the carrying tray 1 to partition the plurality of receiving grooves 13. In an implementing manner, each partitioning wall 17 may be perpendicular to the side wall 12, but may be not limited thereto, for example, the partitioning wall 17 and the side wall 12 may also be provided at an angle therebetween.

The carrying tray 1 further includes a plurality of supporting portions 14, one of the plurality of supporting portions 14 is provided in each receiving groove 13. The supporting portion 14 may be an elongated structure and is parallel to the partitioning wall 17 so as to partition the receiving groove 13 into two sub-grooves 131. That is to say, the plurality of supporting portions 14 and the plurality of partitioning walls 17 are alternated along the length direction D1. The supporting portion 14 is used to support the busbar 2 when the busbar 2 is mounted in the receiving groove 13. The two sub-grooves 131 are used to receive two battery connecting portions of the busbar 2 respectively.

The carrying tray 1 further includes a plurality of pressing members 15, each sub-groove 131 is provided with one or more of the plurality of pressing members 15. When the busbar 2 is mounted in the receiving groove 13, the pressing member 15 is capable of pressing against the battery connecting portion of the busbar 2 and preventing the busbar 2 from being detached from the receiving groove 13. In an implementing manner, the pressing member 15 may be an elastic latching member, but the pressing member 15 is not limited thereto.

It is noted that, the busbar 2 is limited in the receiving groove 13 under the cooperation of the partitioning wall 17, the supporting portion 14 and the pressing member 15, but the busbar 2 is not absolutely fixed relative to the carrying tray 1, the busbar 2 is capable of having a slight movement relative to the carrying tray 1 so as to accommodate a subsequent ultrasonic welding process.

Continuously referring to FIG. 2 and FIG. 3, the carrying tray 1 further includes a snapping post 18 which protrudes from the tray body 11. The flexible circuit board 3 has a snapping hole 34. When the flexible circuit board 3 is assembled to the carrying tray 1, the snapping post 18 snaps with the snapping hole 34.

Figure 4:
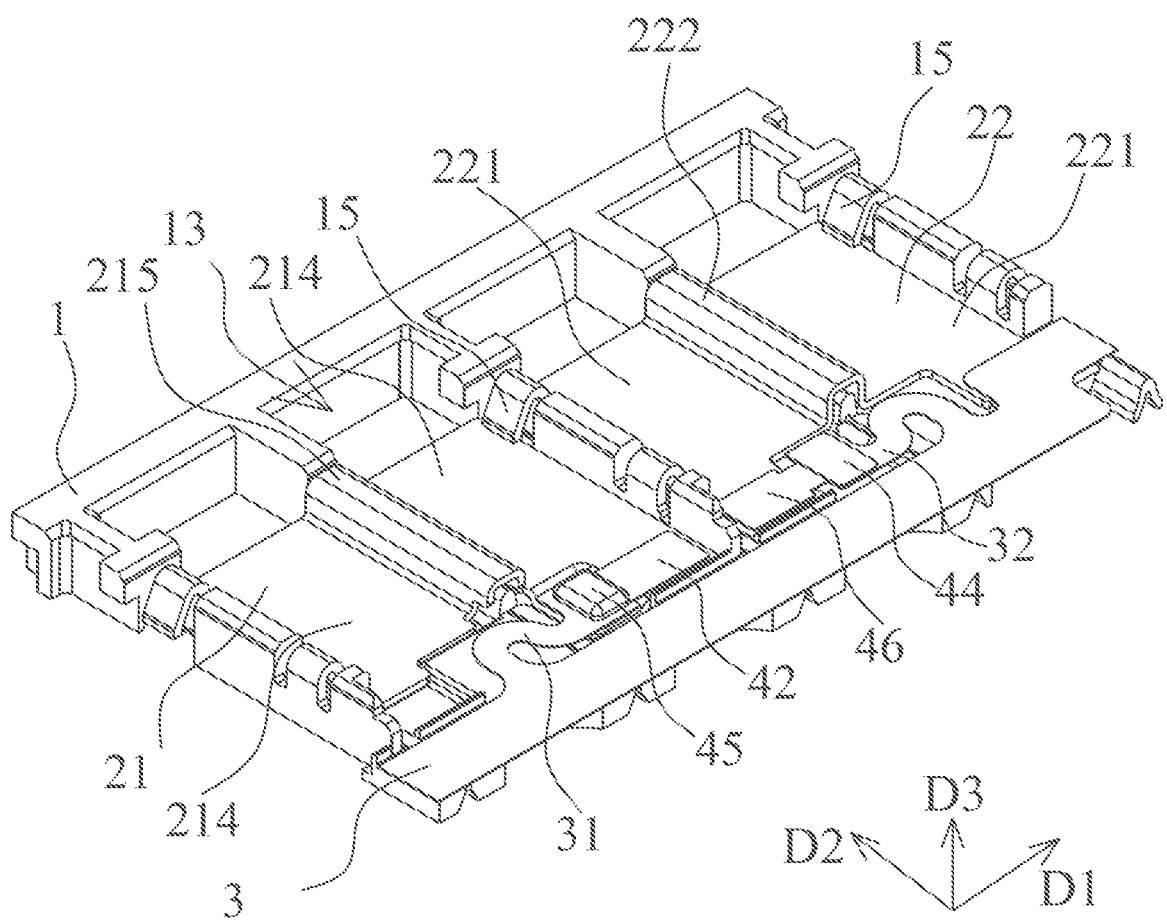
FIG. 4 illustrates a structural schematic view of the battery connection module of the first embodiment of the present disclosure with the upper cover removed.
Figure 5:
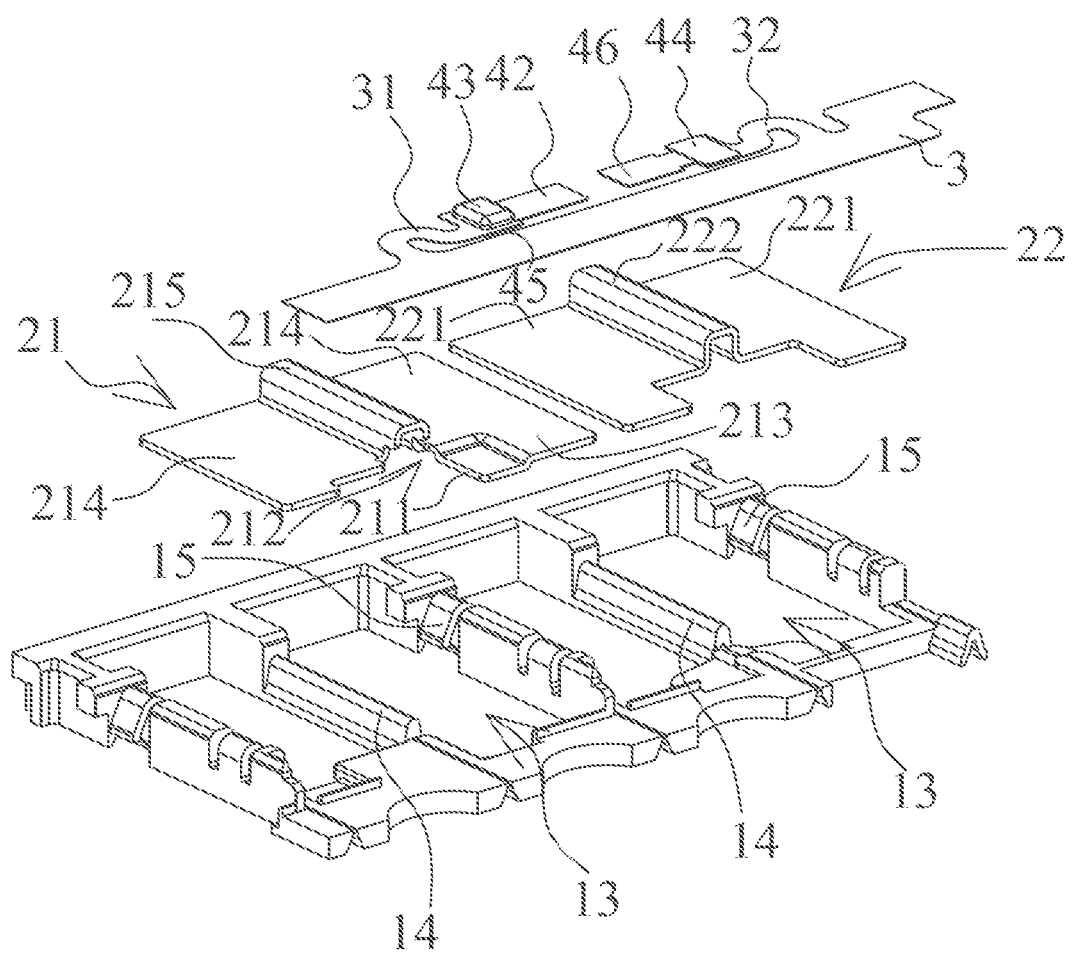
FIG. 5 illustrates an exploded schematic view of the battery connection module of the first embodiment of the present disclosure with the upper cover removed.

As shown in FIG. 2, FIG. 4 and FIG. 5, FIG. 4 illustrates a structural schematic view of the battery connection module 100 of the first embodiment of the present disclosure with the upper cover 5 removed, FIG. 5 illustrates an exploded schematic view of the battery connection module 100 of the first embodiment of the present disclosure with the upper cover 5 removed. The plurality of busbars 2 can be provided in the plurality of receiving grooves 13 of the carrying tray 1 respectively and can be mechanically and electrically connected to electrodes of the plurality of batteries by welding (for example, ultrasonic welding). Furthermore, the plurality of busbar 2 are staggeringly arranged to connect the plurality of batteries from beginning to end to form an in-series power circuit.

Each the busbar 2 may be formed by integrally bending a conductive material. The plurality of busbars 2 are used to connect the plurality of batteries in series and are further divided into a first busbar 21 and a second busbar 22 depending on whether the busbar 2 takes part in the temperature sensing of the battery. Here, the first busbar 21 takes part in the temperature sensing of the battery. The number of the first busbar 21 may be one or plurality and the number of the second busbar 22 may be plurality.

As shown in FIG. 4 and FIG. 5, the first busbar 21 has two or more battery connection portions 214 and a buffering portion 215 positioned between the two adjacent battery connection portions 214. In the present embodiment, the first busbar 21 has two battery connection portions 214.

The first busbar 21 has a cutout 212 which is formed on a side of the first busbar 21 facing the flexible circuit board 3 and a protruding plate portion 213 which is positioned alongside the cutout 212, the cutout 212 spans the buffering portion 215, and a side of the protruding plate portion 213 facing the cutout 212 has a depressed portion 211. The cutout 212 and the protruding plate portion 213 of the first busbar 21 face the flexible circuit board 3 along the width direction D2.

The second busbar 22 has two or more battery connection portions 221 and a buffering portion 222 positioned between the two adjacent battery connection portions 221. In the present embodiment, the second busbar 22 has two battery connection portions 221.

As shown in FIG. 2, FIG. 4 and FIG. 5, the flexible circuit board 3 is assembled on the carrying tray 1 and extends along the length direction D1. As described above, the flexible circuit board 3 and the carrying tray 1 can be connected by that the snapping post 18 and the snapping hole 34 snap with each other. The flexible circuit board 3 includes a plurality of flexible supporting arms which extend from the flexible circuit board 3 to connect the plurality of busbars 2. The plurality of flexible supporting arms are further divided into a first flexible supporting arm 31 and a second flexible supporting arm 32 depending on whether the flexible supporting arm takes part in temperature sensing of the battery. Here, the first flexible supporting arm 31 takes part in the temperature sensing of the battery. The number of the first flexible supporting arm 31 may be one or more and the number of the second flexible supporting arm 32 may be plurality.

The first flexible supporting arm 31 extends into the cutout 212 of the first busbar 21. Further, a tip of the first flexible supporting arm 31 extends into the cutout 212 of the first busbar 21 and extends in the length direction D1.

Figure 6:
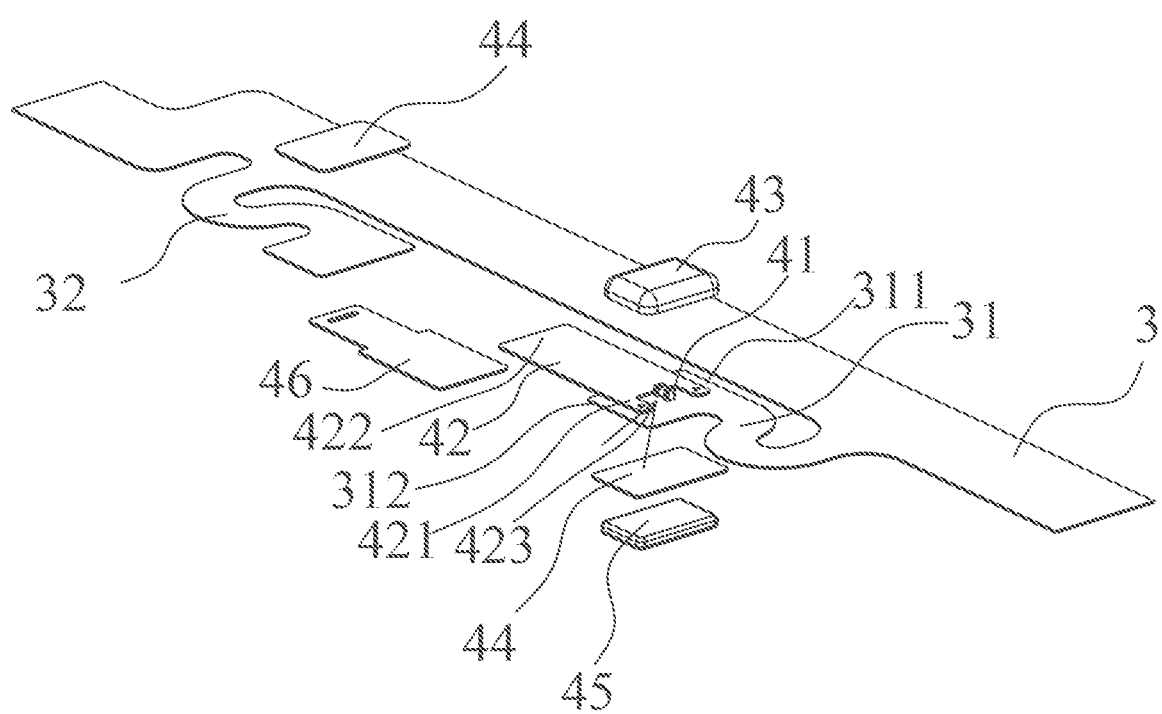
FIG. 6 illustrates an exploded schematic view of a temperature sensing construction of the first embodiment of the present disclosure with a first busbar removed.
Figure 7:
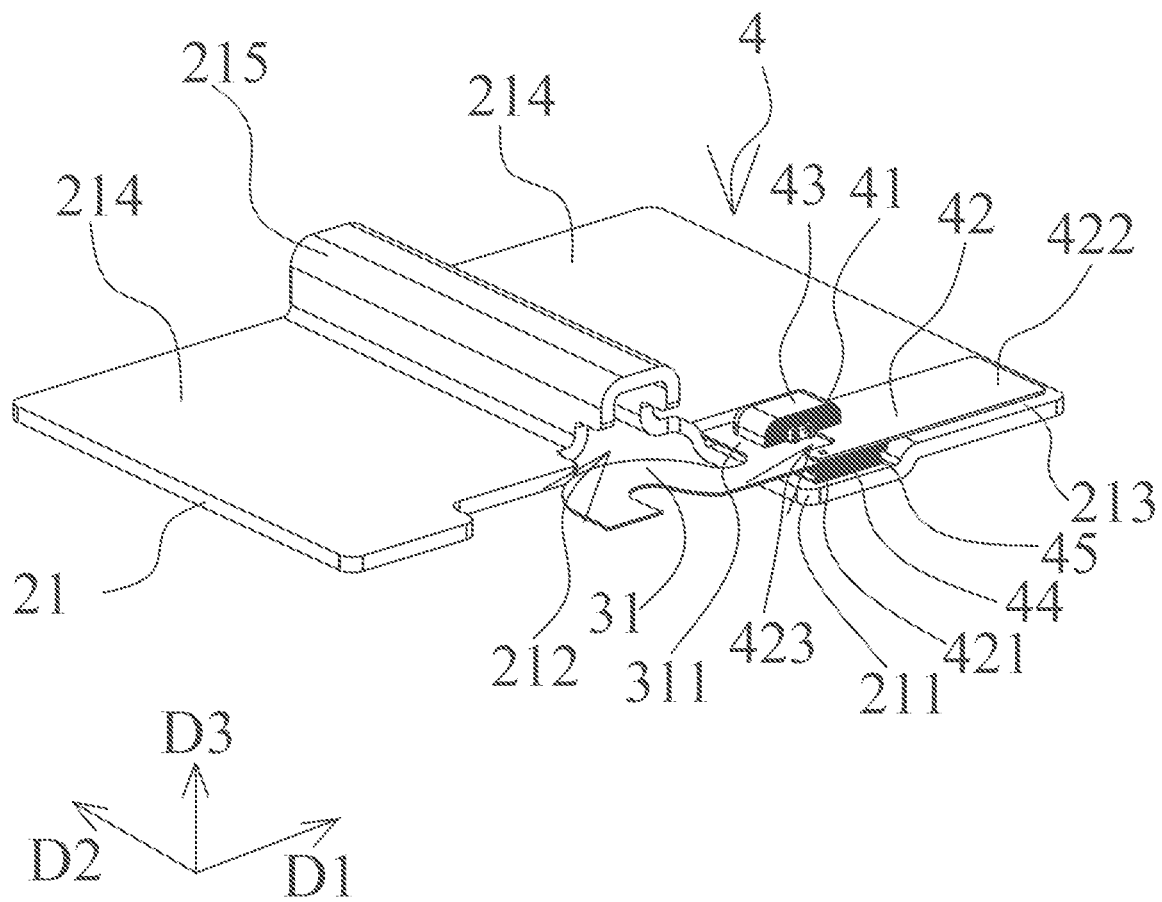
FIG. 7 illustrates a structural schematic view of the temperature sensing construction of the first embodiment of the present disclosure.

As shown in FIG. 5 to FIG. 7, FIG. 6 illustrates an exploded schematic view of the temperature sensing construction 4 of the first embodiment of the present disclosure with the first busbar 21 removed, FIG. 7 illustrates a structural schematic view of the temperature sensing construction 4 of the first embodiment of the present disclosure. The number of at least one temperature sensing construction 4 may be one or plurality, and plurality refers to two or more.

The temperature sensing construction 4 includes a first flexible supporting arm 31, a first busbar 21, a temperature sensor 41 and a first metal bridging piece 42, the first flexible supporting arm 31 is one of the plurality of flexible supporting arms and the first busbar 21 is one of the plurality of busbars 2.

The first busbar 21 has a depressed portion 211 close to the flexible circuit board 3, a tip of the flexible supporting arm 31 has a setting surface 311 which is used to provide the temperature sensor 41 thereon. The temperature sensor 41 is directly positioned above the depressed portion 211, the first metal bridging piece 42 includes a first end 421 and a second end 422, the first end 421 is connected to the setting surface 311 of the tip of the flexible supporting arm 31, the second end 422 is connected to the first busbar 21.

It is noted that, the temperature sensor 41 (for example, NTC (Negative Temperature Coefficient thermistor)) may be electrically connected to a temperature collection circuit trace (not shown) of the flexible circuit board 3 so as to be used to collect temperature. For example, the temperature sensor 41 may be mechanically and electrically connected to the temperature collection circuit trace of the flexible circuit board 3 by welding.

The first metal bridging piece 42 may be a metal which is good in thermal conductivity (for example, an aluminum piece) or a metal which may be both thermally conductive and electrically conductive (for example, a nickel piece). The first metal bridging piece 42 is capable of conducting heat to increase accuracy of the temperature collection of the temperature sensor 41 and shorten temperature response time. However, in other varied implementing manners, the first metal bridging piece 42 may be other suitable material as desired.

In the battery connection module 100 of the embodiment of the present disclosure, the temperature sensor 41 is directly close to the depressed portion 211 of the first busbar 21 which generates heat and due to the thermal conductivity of the first metal bridging piece 42 immediately adjacent to the temperature sensor 41, it is able to increase the accuracy of the temperature collection of the temperature sensor 41 and shorten the temperature response time.

As shown in FIG. 6 and FIG. 7, the first metal bridging piece 42 extends in the length direction D1. The first end 421 of the first metal bridging piece 42 has an opening 423, the temperature sensor 41 is positioned in the opening 423. The second end 422 of the first metal bridging piece 42 is connected to the protruding plate portion 213.

In the present embodiment, by a design that the first end 421 of the first metal bridging piece 42 has the opening 423 and the temperature sensor 41 is positioned in the opening 423, it can make the temperature sensor 41 closer to the first metal bridging piece 42 so as to further enhance the accuracy of temperature collection by the temperature sensor 41.

It is noted that, the first end 421 of the first metal bridging piece 42 may be connected to the first flexible supporting arm 31 of the flexible circuit board 3 by means of an adhesive. For example, the adhesive may be a thermally conductive adhesive. In a varied embodiment, the first metal bridging piece 42 may also be connected to the flexible circuit board 3 and the first busbar 21 by means of welding (for example, ultrasonic welding) or soldering.

The temperature sensing construction 4 further includes a packaging block 43 provided on the setting surface 311, the packaging block 43 fully covers the temperature sensor 41 and the first end 421 of the first metal bridging piece 42.

In the present embodiment, the packaging block 43 fully covers the temperature sensor 41 and the first end 421 of the first metal bridging piece 42, the packaging block 43 functions as protecting the temperature sensor 41. The packaging block 43 may be an adhesive, a thermally conductive adhesive, an anti-oxidant protective adhesive or a combination thereof, and a material of the packaging block 43 may be, for example, silicone, epoxy resin or the like.

As shown in FIG. 6 and FIG. 7, the temperature sensing construction 4 further includes a back plate 44, the back plate 44 is provided on a back surface 312 of the first flexible supporting arm 31 opposite to the setting surface 311 of the first flexible supporting arm 31.

The setting surface 311 of the first flexible supporting arm 31 provided with the temperature sensor 41 and the packaging block 43 back the depressed portion 211.

The temperature sensing construction 4 further includes a thermal conductive pad 45, the thermal conductive pad 45 is provided between the back plate 44 and a bottom surface of the depressed portion 211. The present embodiment specifically defines the thermal conductive pad 45 provided between the back plate 44 and the bottom surface of the depressed portion 211, the packaging block 43 which is thermally conductive or the thermal conductive pad 45 which is additionally provided can further enhance heat transfer and shorten the response time of the temperature sensor 41.

In an implementing manner, the first metal bridging piece 42 is electrically connected to a voltage collection circuit trace (not shown) of the flexible circuit board 3 so as to be used to voltage collection. In other words, in this implementing manner, the first metal bridging piece 42 also may be connected to a metal pad (not shown) of the flexible circuit board 3 by welding, may not only function as temperature sensing but also as voltage collecting.

As shown in FIG. 2, FIG. 4 and FIG. 5, the battery connection module 100 further includes a plurality of second metal bridging pieces 46. The second metal bridging piece 46 and the first metal bridging piece 42 are two independent members. One end of the second metal bridging piece 46 is connected to the second flexible supporting arm 32 and the other end of the second metal bridging piece 46 is connected to the second busbar 22. The second metal bridging piece 46 is electrically connected to a voltage collection circuit trace (not shown) of the flexible circuit board 3 so as to be used to collect voltage. In an implementing manner, the battery connection module 100 further includes a back plate 44, the back plate 44 and the second metal bridging piece 46 are provided on opposite surfaces of the second flexible supporting arm 32 respectively.

The second metal bridging piece 46 may be made of a metal material which is electrically conductive (for example, a nickel piece).

Figure 8:
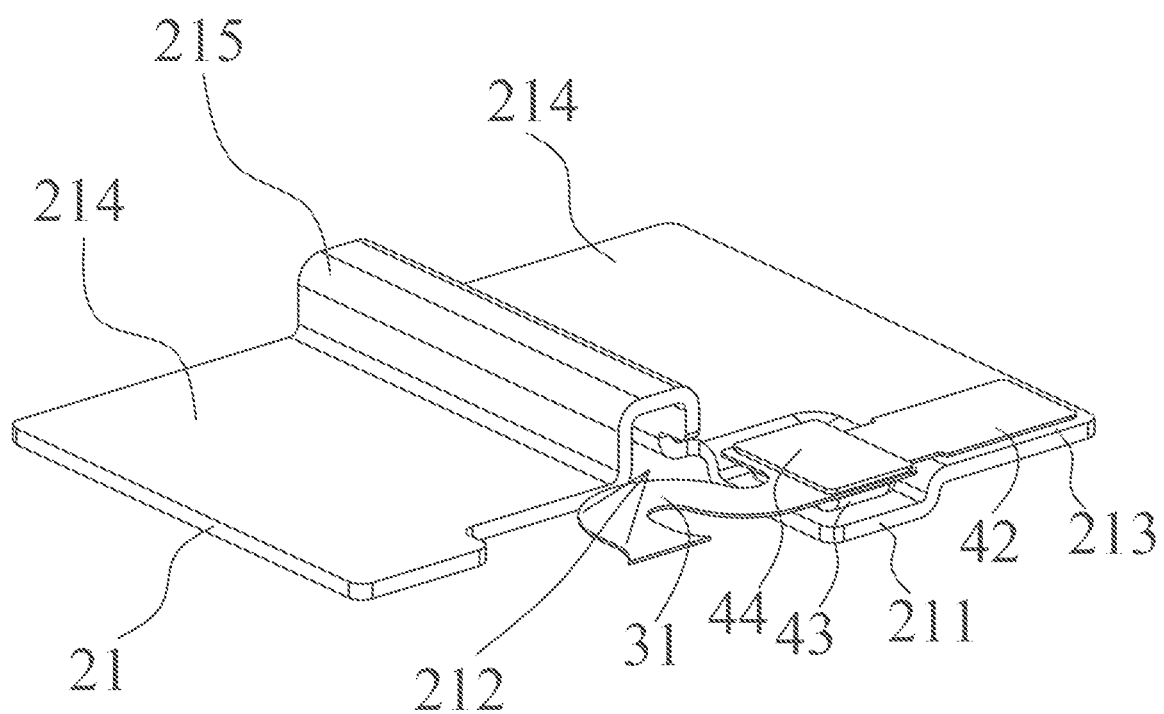
FIG. 8 illustrates a structural schematic view of a temperature sensing construction of a second embodiment of the present disclosure.
Figure 9:
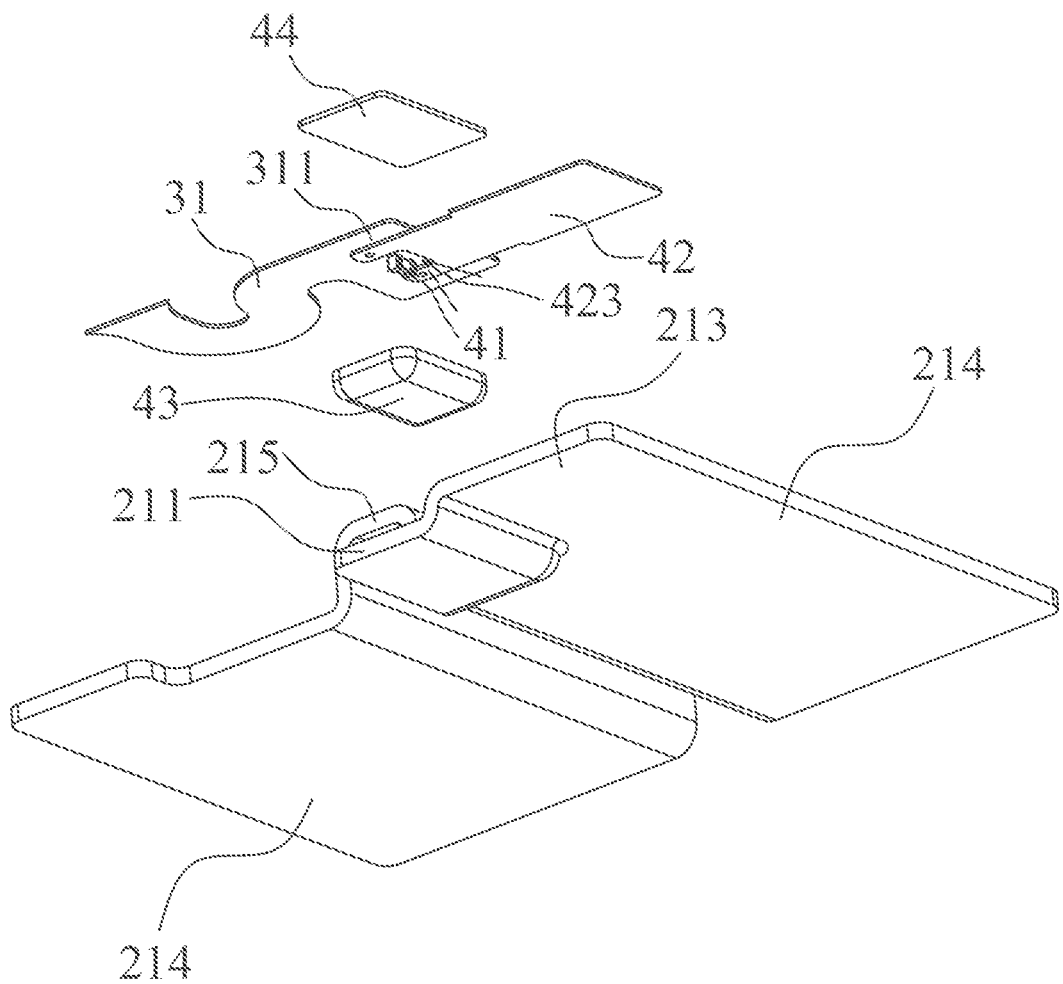
FIG. 9 illustrates a structural schematic view of the temperature sensing construction of the second embodiment of the present disclosure.

As shown in FIG. 8 and FIG. 9, FIG. 8 illustrates a structural schematic view of a temperature sensing construction 4 of a second embodiment of the present disclosure, FIG. 9 illustrates a structural schematic view of the temperature sensing construction 4 of the second embodiment of the present disclosure. The temperature sensing construction 4 of the second embodiment of the present disclosure differs from the above embodiment in that, the setting surface 311 of the first flexible supporting arm 31 provided with the temperature sensor 41 and the packaging block 43 face the depressed portion 211. The packaging block 43 is close to or attaches to the bottom surface of the depressed portion 211 to enhance heat transfer and shorten the response time of the temperature sensor 41.

Figure 10:
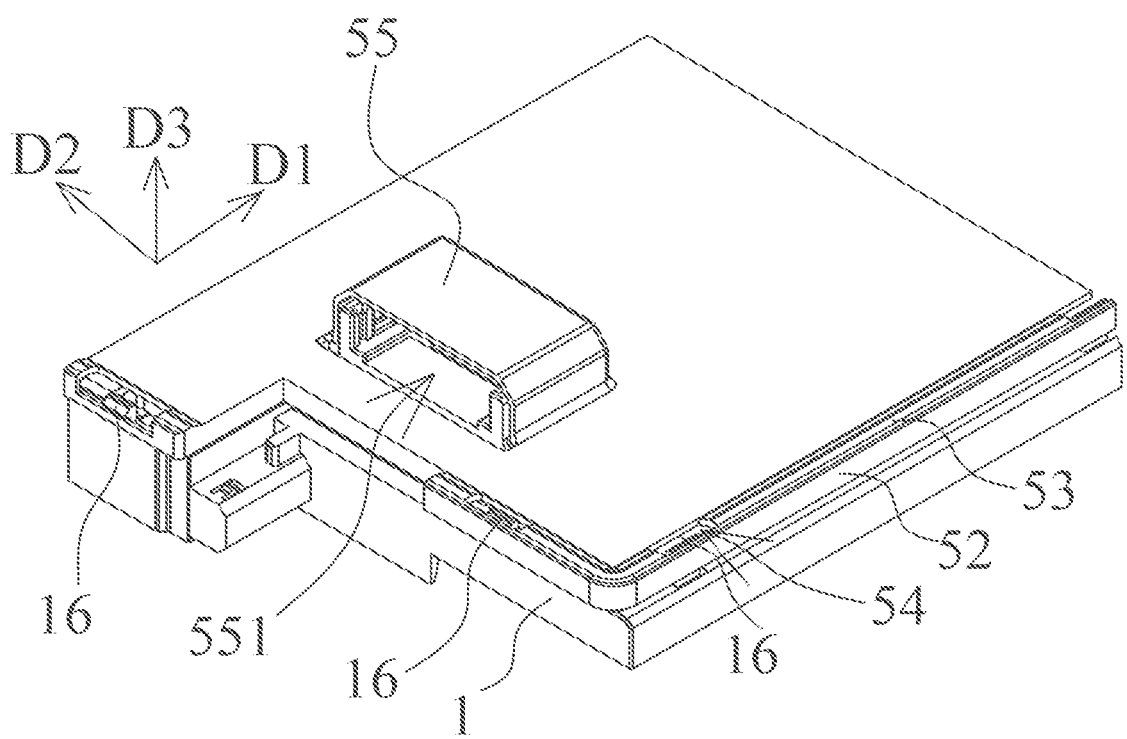
FIG. 10 illustrates a structural schematic view of the carrying tray and the upper cover of the second embodiment of the present disclosure after assembled.
Figure 11:
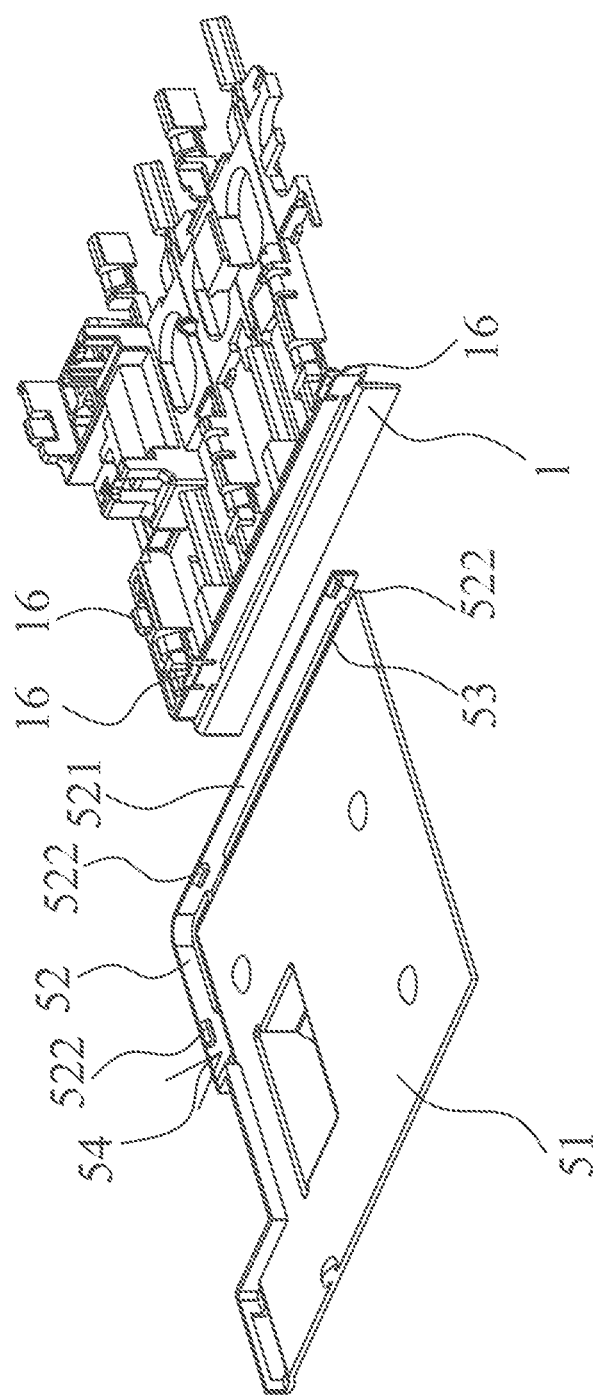
FIG. 11 illustrates a structural schematic view of the carrying tray and the upper cover of the second embodiment of the present disclosure.

As shown in FIG. 2, FIG. 10 and FIG. 11, FIG. 10 illustrates a structural schematic view of the carrying tray 1 and the upper cover 5 of the second embodiment of the present disclosure after assembly, FIG. 11 illustrates a structural schematic view of the carrying tray 1 and the upper cover 5 of the second embodiment of the present disclosure.

The battery connection module 100 of the embodiment of the present disclosure further includes the upper cover 5, the upper cover 5 latches with the carrying tray 1, the upper cover 5 has a top plate 51 and a skirt edge 52 which is positioned around the top plate 51 and is vertically provided. The skirt edge 52 has no broken hole, the inner wall surface 521 of the skirt edge 52 is provided with a first latching portion 522 which extends inwardly, and a periphery of the carrying tray 1 is provided with a second latching portion 16 which extend outwardly, the second latching portion 16 latches with the first latching portion 522.

It is noted that, that the skirt edge 52 has no broken holes refers to that the skirt edge 52 is a complete and continuous ring structure, the complete and continuous ring structure is not provided with a hole, a groove, a slit or the like which destroys the structural strength of the skirt edge 52, the ring structure encloses an edge of the top plate 51.

In the present embodiment, because the skirt edge 52 has no broken holes and the inner wall surface 521 of the skirt edge 52 is provided with the first latching portion 522 which extends inwardly, the structural strength of the skirt edge 52 of the upper cover 5 is ensured, in a process that the upper cover 5 repeatedly latches with the carrying tray 1, a problem, such as damaging and warping of the upper cover 5, which affects quality of the upper cover 5, is not prone to occur.

As shown in FIG. 10, a bending edge 53 which warps upwardly is provided close to the edge of the top plate 51 of the upper cover 5, that is, the bending edge 53 is provided between the skirt edge 52 and the top plate 51. The structural strength of the upper cover 5 can be further strengthened by the design of the bending edge 53.

An aperture 54 is provided close to the edge of the top plate 51 of the upper cover 5 and corresponds to the first latching portion 522. The first latching portion 522 and the second latching portion 16 are exposed through the aperture 54. This facilitates an operator to observe whether the first latching portion 522 and the second latching portion 16 latch with each other.

Figure 12:
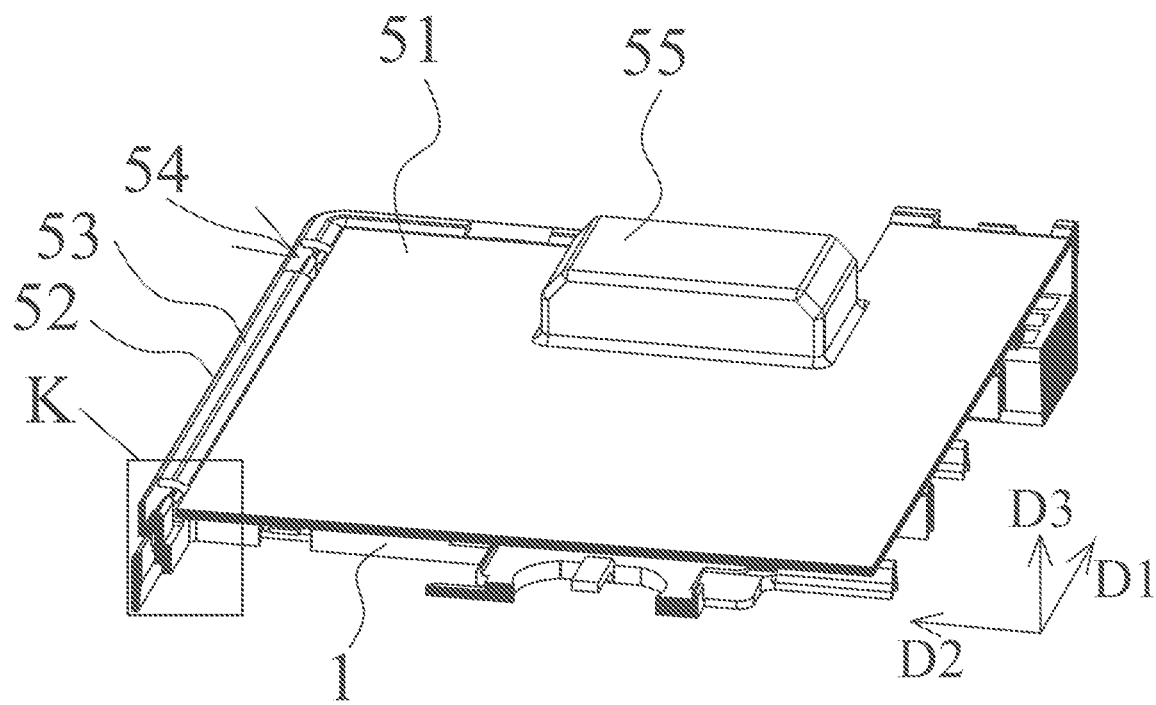
FIG. 12 illustrates a cut away view of the carrying tray and the upper cover of the second embodiment of the present disclosure after assembled.
Figure 13:
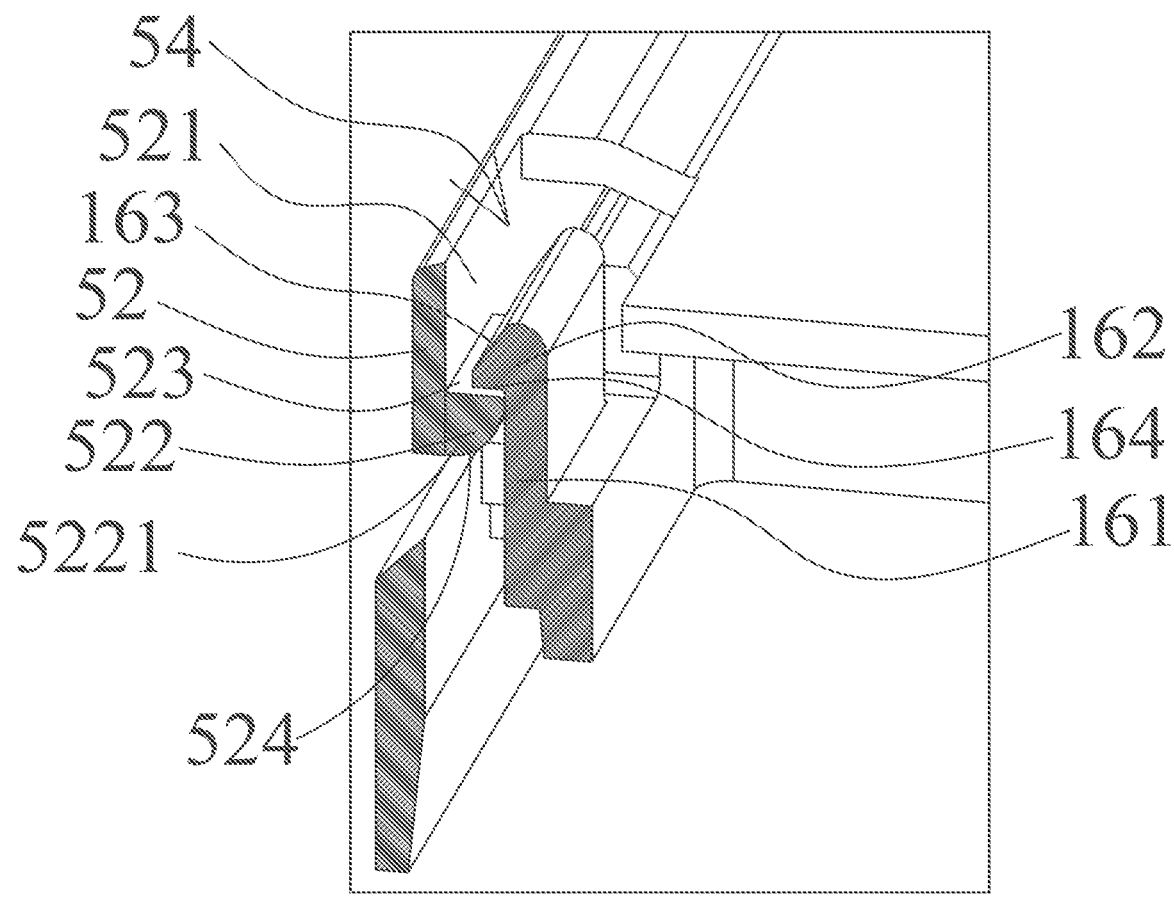
FIG. 13 illustrates a partially enlarged view of a part indicated by K in FIG. 12.

As shown in FIG. 12 and FIG. 13, FIG. 12 illustrates a cut away view the carrying tray 1 and the upper cover 5 of the second embodiment of the present disclosure after assembled, FIG. 13 illustrates a partially enlarged view of a part indicated by K in FIG. 12. The first latching portion 522 is constructed as a protruding block 5221 which extends inwardly, the second latching portion 16 has an upward extending arm 161 which is deflectable and a latching block 162 which extend outwardly, the latching block 162 latches with an upper end of the protruding block 5221.

The protruding block 5221 has a first latching surface 523 and a first guiding surface 524, the latching block 162 has a second guiding surface 163 and a second latching surface 164. Both the first latching surface 523 and the second latching surface 164 are flat surfaces, and the first latching surface 523 extends horizontally and inwardly from the inner wall surface 521 of the skirt edge 52, the second latching surface 164 extends horizontally and outwardly from an outer wall surface of the upward extending arm 161. One of the first guiding surface 524 and the second guiding surface 163 is an oblique surface, the other of the first guiding surface 524 and the second guiding surface 163 is an outer circular arc surface. When the protruding block 5221 and the latching block 162 latch with each other, the first guiding surface 524 and the second guiding surface 163 are capable of abutting against each other and sliding relative to each other, and the first latching surface 523 and the second latching surface 164 are capable of latching with each other.

In the present embodiment, the first guiding surface 524 is an outer circular arc surface; the second guiding surface 163 is an oblique surface.

It is noted that, "inwardly" refers to a range enclosed by the inner wall surface 521 of the skirt edge 52, "outwardly" refers to toward a position where the outer wall surface of the skirt edge 52 is present. "up" and "down" refers to along an up-down direction D3 (an arrow of the up-down direction D3 in the drawing points the up and the opposite is down), the up-down direction D3 is perpendicular to the length direction D1 and the width direction D2 herein.

When the upper cover 5 is latched to the carrying tray 1 in an up-down direction D3, the first guiding surface 524 of the protruding block 5221 and the second guiding surface 163 of the latching block 162 are capable of abutting against each other and sliding relative to each other, and the protruding block 5221 squeezes the latching block 162. Because the upward extending arm 161 of the latching block 162 is deflectable, the upward extending arm 161 swings inwardly under action of squeezing of the protruding block 5221. As the upper cover 5 is moved downwardly, the upper extending arm 161 swings inwardly at a gradually increased angle. When the first guiding surface 524 of the protruding block 5221 just leaves from the second guiding surface 163 of the latching block 162, the upward extending arm 161 is restored immediately, at this time the protruding block 5221 and the latching block 162 latch with each other. Because the first latching surface 523 of the protruding block 5221 and the second latching surface 164 of the latching block 162 latch with each other in the up-down direction D3 and form movement interference therebetween, so the upper cover 5 is not detached from the carrying tray 1.

When it toned to detach the upper cover 5 from the carrying tray 1, the latching block 162 is pushed inwardly to cause the upward extending arm 161 to swing inwardly. When the second latching surface 164 of the latching block 162 leaves from the first latching surface 523 of the protruding block 5221, the protruding block 5221 unlatches with the latching block 162.

As shown in FIG. 1 to FIG. 3, the flexible circuit board 3 further has a connector 33. A shroud 55 protrudes from an upper surface of the top plate 51 of the upper cover 5, the shroud 55 forms a receiving space 551, the receiving space 551 is used to receive the connector 33 of the flexible circuit board 3.

The shroud 55 is provided with a window 552. When the flexible circuit board 3 is assembled on the carrying tray 1 and the upper cover 5 latches with the carrying tray 1, the connector 33 is received in the receiving space 551 formed by the shroud 55 and is exposed through the window 552. An external cable (not shown) may be connected with the connector 33 via the window 552 to allow a battery management device (not shown) to be connected to the flexible circuit board 3, so as to transmit the temperature information and/or voltage information collected by the flexible circuit board 3 to the battery management device.

In conclusion, the battery connection module 100 of the embodiments of the present disclosure at least includes the following advantages and beneficial effects.

In the battery connection module 100 of the embodiment of the present disclosure, the temperature sensor 41 is directly close to the depressed portion 211 of the first busbar 21 which generates heat and due to the thermal conductivity of the first metal bridging piece 42 immediately adjacent to the temperature sensor 41, it is able to increase the accuracy of the temperature collection of the temperature sensor 41 and shorten the temperature response time.

In addition, the temperature sensing construction 4 further includes a thermal conductive pad 45, the thermal conductive pad 45 is provided between the back plate 44 and a bottom surface of the depressed portion 211. The packaging block 43 which is thermally conductive or the thermal conductive pad 45 which is additionally provided can further enhance heat transfer and shorten the response time of the temperature sensor 41.

In addition, because the skirt edge 52 has no broken holes and the inner wall surface 521 of the skirt edge 52 is provided with the first latching portion 522 which extends inwardly, the structural strength of the skirt edge 52 of the upper cover 5 is ensured, in a process that the upper cover 5 repeatedly latches with the carrying tray 1, a problem, such as damaging and warping of the upper cover 5, which affects quality of the upper cover 5, is not prone to occur.

In the embodiments of the present disclosure, the terms "first", "second" and "third" are only used for purpose of description and cannot be construed as indicating or implying relative importance; and the term "a plurality of or plurality" refers to "two or more", unless expressly defined otherwise. The terms "mount", "connect with", "connect", "fix" and the like should be broadly understood, for example, the "connect" may be fixedly connect, detachably connect or integrally connect, "connect with" may be directly connect with or indirectly connect with via an intermediate medium. The skilled in the art may understand specific meaning of these terms in embodiment of the present disclosure according to the specific situations.

In the description of the embodiments of the present disclosure, it is to be understood that, the orientation or position relationship indicated by the terms such as "up", "down", "left", "right", "front", "rear" and the like is based on the orientation or position relation indicated by the drawings, only serves to facilitate describing the present disclosure and simplifying the description, rather than indicating or implying that the referred device or unit must have the particular orientation, constructed and operate in the particular orientation, so cannot be construed as limiting the embodiments of the present disclosure.

In the description of the present specification, the description of the terms "one embodiment", "some embodiments", "specific embodiments" and the like refers to that a specific feature, structure, material or characteristic described in combination with the embodiment or example is included in at least one embodiment or example of the embodiments of the present disclosure. In the present specification, the illustrative expression of the above terms does not necessarily refer to the same embodiment or example. Furthermore, the specific features, structures, materials or characteristics described may be combined in a suitable manner in any one or more embodiments or examples.

The above descriptions are only preferred embodiments of the present disclosure and are not intended to limit the embodiments of the present disclosure. For the person skilled in the art, various modifications and changes may be made to the embodiments of the present disclosure. Any modifications, equivalent replacements, improvements and the like made within the spirit and principle of the embodiments of the present disclosure shall be included within the protective scope of the embodiments of the present disclosure.

What is claimed is:

1. A battery connection module which is used to connect a plurality of batteries, the battery connection module comprising:
    a carrying tray;
    a plurality of busbars which are assembled on the carrying tray and are used to connect the plurality of batteries in series;
    a flexible circuit board which is assembled on the carrying tray, the flexible circuit board comprising a plurality of flexible supporting arms which extend from the flexible circuit board to connect the plurality of busbars; and
    at least one temperature sensing construction which comprises a first flexible supporting arm, a first busbar, a temperature sensor and a first metal bridging piece, the first flexible supporting arm being one of the plurality of flexible supporting arms and the first busbar being one of the plurality of busbars; and
    the first busbar having a depressed portion adjacent to the flexible circuit board, a tip of the first flexible supporting arm having a setting surface which is used to provide the temperature sensor thereon, the temperature sensor being directly positioned above the depressed portion, the first metal bridging piece comprising a first end and a second end, the first end being connected to the setting surface of the tip of the flexible supporting arm, the second end being connected to the first busbar, the first end of the first metal bridging piece having an opening, the temperature sensor is positioned in the opening.

2. The battery connection module according to claim 1, wherein
    the temperature sensing construction further comprises a packaging block which is provided on the setting surface, the packaging block fully covers the temperature sensor and the first end of the first metal bridging piece.

3. The battery connection module according to claim 2, wherein
    the temperature sensing construction further comprises a back plate, the back plate is provided on a back surface of the first flexible supporting arm opposite to the setting surface of the first flexible supporting arm.

4. The battery connection module according to claim 3, wherein
    the setting surface and the packaging block back the depressed portion.

5. The battery connection module according to claim 4, wherein
    the temperature sensing construction further comprises a thermal conductive pad, the thermal conductive pad is provided between the back plate and a bottom surface of the depressed portion.

6. The battery connection module according to claim 3, wherein
    the setting surface and the packaging block face the depressed portion.

7. The battery connection module according to claim 1, wherein
    the first busbar has a cutout formed at a side of the first busbar which faces the flexible circuit board and a protruding plate portion positioned alongside the cutout, a side of the protruding plate portion facing the cutout has the depressed portion, the first flexible supporting arm extends into the cutout, the second end of the first metal bridging piece is connected to the protruding plate portion.

8. The battery connection module according to claim 7, wherein
    the flexible circuit board extends along a length direction, the cutout and the protruding plate portion face the flexible circuit board along a width direction, the tip of the first flexible supporting arm extends into the cutout and extends in the length direction, the first metal bridging piece extends in the length direction.

9. The battery connection module according to claim 8, wherein
    the first busbar has two or more battery connection portions and a buffering portion positioned between two adjacent ones of the battery connection portions, the cutout spans the buffering portion.

10. The battery connection module according to claim 9, wherein the first metal bridging piece is electrically connected to a voltage collection circuit trace of the flexible circuit board so as to collect voltage.

11. The battery connection module according to claim 1, further comprising an upper cover which latches with the carrying tray and has a top plate and a skirt edge positioned around the top plate and vertically provided; and the skirt edge having no broken holes, an inner wall surface of the skirt edge being provided with a first latching portion which extends inwardly, and a periphery of the carrying tray being provided with a second latching portion which extends outwardly and latches with the first latching portion.

12. The battery connection module according to claim 11, wherein the first latching portion is constructed as a protruding block which extends inwardly; and the second latching portion has an upward extending arm which is deflectable and a latching block which extends outwardly, the latching block latches with an upper end of the protruding block.

13. The battery connection module according to claim 12, wherein the protruding block has a first latching surface and a first guiding surface, the latching block has a second guiding surface and a second latching surface;

both the first latching surface and the second latching surface are flat surfaces, the first latching surface extends horizontally and inwardly from the inner wall surface of the skirt edge, the second latching surface extends horizontally and outwardly from an outer wall surface of the upward extending arm; and when the protruding block and the latching block latch with each other, the first guiding surface and the second guiding surface are capable of abutting against each other and sliding relative to each other, and the first latching surface and the second latching surface are capable of latching with each other.

14. The battery connection module according to claim 11, wherein an aperture is provided adjacent to an edge of the top plate of the upper cover and corresponds to the first latching portion.

15. The battery connection module according to claim 11, wherein a bending edge which warps upwardly is provided adjacent to an edge of the top plate of the upper cover.

16. A battery connection module which is used to connect a plurality of batteries, the battery connection module comprising:

a carrying tray;

a plurality of busbars which are assembled on the carrying tray and are used to connect the plurality of batteries in series;

a flexible circuit board which is assembled on the carrying tray, the flexible circuit board comprising a plurality of flexible supporting arms which extend from the flexible circuit board to connect the plurality of busbars; and at least one temperature sensing construction which comprises a first flexible supporting arm, a first busbar, a temperature sensor and a first metal bridging piece, the first flexible supporting arm being one of the plurality of flexible supporting arms and the first busbar being one of the plurality of busbars; and the first busbar having a depressed portion adjacent to the flexible circuit board, a tip of the first flexible supporting arm having a setting surface which is used to provide the temperature sensor thereon, the temperature sensor being directly positioned above the depressed portion, the first metal bridging piece comprising a first end and a second end, the first end being connected to the setting surface of the tip of the flexible supporting arm, the second end being connected to the first busbar, the first busbar further having a cutout formed at a side of the first busbar which faces the flexible circuit board and a protruding plate portion positioned alongside the cutout, a side of the protruding plate portion facing the cutout has the depressed portion, the first flexible supporting arm extends into the cutout, the second end of the first metal bridging piece is connected to the protruding plate portion.

17. The battery connection module according to claim 16, wherein the flexible circuit board extends along a length direction, the cutout and the protruding plate portion face the flexible circuit board along a width direction, the tip of the first flexible supporting arm extends into the cutout and extends in the length direction, the first metal bridging piece extends in the length direction.

18. The battery connection module according to claim 17, wherein the first busbar has two or more battery connection portions and a buffering portion positioned between two adjacent ones of the battery connection portions, the cutout spans the buffering portion.

19. The battery connection module according to claim 16, further comprising an upper cover which latches with the carrying tray and has a top plate and a skirt edge positioned around the top plate and vertically provided; and the skirt edge having no broken holes, an inner wall surface of the skirt edge being provided with a first latching portion which extends inwardly, and a periphery of the carrying tray being provided with a second latching portion which extends outwardly and latches with the first latching portion.

20. The battery connection module according to claim 19, wherein the first latching portion is constructed as a protruding block which extends inwardly; and the second latching portion has an upward extending arm which is deflectable and a latching block which extends outwardly, the latching block latches with an upper end of the protruding block.

* * * * *